US006893052B2

United States Patent
Wildermuth et al.

(10) Patent No.: US 6,893,052 B2
(45) Date of Patent: May 17, 2005

(54) CONNECTING ARRANGEMENT FOR COOLANT LINES

(75) Inventors: Andreas Wildermuth, Marbach (DE); Mike Eismann, Oberriexingen (DE)

(73) Assignee: ContiTech Kuehner GmbH & Cie. KG, Oppenweiler (DE)

( * ) Notice: Subject to any disclaimer, the term of this patent is extended or adjusted under 35 U.S.C. 154(b) by 0 days.

(21) Appl. No.: 10/771,397

(22) Filed: Feb. 5, 2004

(65) Prior Publication Data

US 2004/0155456 A1 Aug. 12, 2004

(30) Foreign Application Priority Data

Feb. 5, 2003 (EP) ............................................. 03002425

(51) Int. Cl.[7] .............................. F16L 41/00; F16L 5/00
(52) U.S. Cl. .................... 285/205; 285/206; 285/124.1; 285/124.2; 285/379
(58) Field of Search ................................ 285/205, 206, 285/207, 208, 124.1, 124.2, 124.3, 124.4, 124.5, 379

(56) References Cited

U.S. PATENT DOCUMENTS

| 2,353,477 | A | * | 7/1944 | Koppel ........................ 285/205 |
| 3,831,951 | A | * | 8/1974 | Patel et al. .................. 277/641 |
| 4,247,135 | A | * | 1/1981 | Weirich et al. .......... 285/124.4 |
| 4,796,896 | A | * | 1/1989 | Anderson, Jr. ............... 277/637 |
| 5,145,219 | A | | 9/1992 | Babuder |
| 5,174,612 | A | * | 12/1992 | Schnell ........................ 285/49 |
| 5,271,460 | A | | 12/1993 | O'Brien |
| 5,354,101 | A | * | 10/1994 | Anderson, Jr. ................ 285/25 |
| 5,366,261 | A | * | 11/1994 | Ohmi et al. .................. 285/328 |
| 5,727,304 | A | * | 3/1998 | Eybergen .................. 29/525.04 |
| 5,758,910 | A | * | 6/1998 | Barber et al. ................ 285/330 |
| 5,853,201 | A | | 12/1998 | Izumi et al. |
| 6,386,593 | B1 | | 5/2002 | Slais et al. |
| 6,431,614 | B1 | | 8/2002 | Lafer et al. |
| 6,676,167 | B2 | * | 1/2004 | Schroeder et al. ........... 285/205 |
| 2003/0080554 | A1 | * | 5/2003 | Schroeder et al. ........ 285/125.1 |
| 2004/0080155 | A1 | * | 4/2004 | Hayes et al. .............. 285/124.2 |

FOREIGN PATENT DOCUMENTS

DE         299 08 541       10/1999

* cited by examiner

*Primary Examiner*—James M. Hewitt
(74) *Attorney, Agent, or Firm*—Walter Ottesen

(57) ABSTRACT

A connecting arrangement for coolant lines includes a first coupling piece, connected seal-tight to a first line endpiece, and a second coupling piece, connected seal-tight to a second line endpiece. The coupling pieces each have radially extending sealing surfaces on the side facing toward the other coupling piece. A sealing ring is mounted between the sealing surfaces. The coupling pieces are joined to each other via a screw arranged laterally offset from the sealing surfaces so the line endpieces connect to each other via respective bores in the coupling pieces. A form body between the coupling pieces arranged at a spacing from the screw on the side facing away from the sealing surfaces is configured so a lever action occurs when the coupling pieces are joined to each other leading to a uniform pressing together of the sealing ring between the sealing surfaces of the coupling pieces.

6 Claims, 2 Drawing Sheets

CONNECTING ARRANGEMENT FOR COOLANT LINES

CROSS REFERENCE TO RELATED APPLICATION

This application claims priority of European patent application no. 03002425.1, filed Feb. 5, 2003, the entire content of which is incorporated herein by reference.

BACKGROUND OF THE INVENTION

German patent publication 299 08 541 discloses a connecting arrangement for coolant lines, especially, for motor vehicle climate control systems operated with $CO_2$. In this connecting arrangement, the line endpieces of two coolant lines are each provided with a coupling piece. Both coupling pieces each include a radially running sealing surface on the end facing toward the other coupling piece. A metallic flat ring is seated between the sealing surfaces and has a peripheral recessed portion. The metallic flat ring, which is provided with a peripherally extending recessed portion, is pressed together by the threaded fastener of the two coupling pieces and ensures the necessary axial sealing of the connecting arrangement. The threaded connection of the two coupling pieces takes place in that a coupling piece is provided with an external thread on which a nut threadably engages and this nut is connected to the second coupling piece. Or, the coupling pieces are connected to each other by means of screws. The screws are arranged in a circle about and parallel to the axis of the line endpieces connected within the coupling pieces.

A connecting arrangement of this kind has the disadvantage that the assembly or disassembly thereof is very complex when only a limited space is available.

SUMMARY OF THE INVENTION

It is an object of the invention to provide a connecting arrangement of the kind referred to above configured with the most simple means so that a simple assembly or disassembly of the connecting arrangement is possible also in tight spaces. It is a further object of the invention to provide a tight sealing of the connecting arrangement at pressures up to 145 bar and at temperatures up to 180° C.

The connecting arrangement of the invention is for coolant lines. The connecting arrangement includes: a first coupling piece connectable seal-tight to a first line endpiece; a second coupling piece connectable seal-tight to a second line endpiece; the first and second coupling pieces having first and second bores, respectively, and the first and second bores communicating with the first and second line endpieces, respectively; a single screw joining the first and second coupling pieces so as to cause the first and second line endpieces to communicate with each other via the first and second bores; the first and second coupling pieces having first and second sealing surfaces facing toward each other; a seal unit disposed between the first and second coupling pieces; the seal unit including a plastic cap and a sealing ring seated in the plastic cap; a non-compressible body disposed between the first and second coupling pieces at a distance from the single screw which is so configured that a lever action arises when the single screw is manipulated to draw the first and second coupling pieces toward each other with the lever action leading to a uniform pressing of the sealing ring between the first and second sealing surfaces; the first and second sealing surfaces extending radially and being laterally offset from the single screw on a side of the single screw facing away from the non-compressible body; and, the plastic cap and one of the first and second coupling pieces conjointly defining a latching interface so as to permit the seal unit to be mounted on the one coupling piece so as to place the sealing ring between the first and second sealing surfaces before the single screw is manipulated to draw the coupling pieces and the sealing surfaces toward each other.

The connecting arrangement of the invention includes a first coupling piece, which is connected seal-tight to a first line endpiece, and a second coupling piece which is connected seal-tight to a second line endpiece. The connection between the coupling pieces and line endpieces is preferably non-detachable. The coupling piece preferably has a bore in which the line endpiece is seated. At the same time, the bore functions as a connecting channel. Both coupling pieces are connected to each other with only a single screw whereby the line endpieces are connected to each other via the bores. Each of the coupling pieces has a radially extending sealing surface on the end facing toward the other coupling piece. A sealing ring is mounted between the sealing surfaces. The above-mentioned single screw is mounted laterally offset from the sealing surfaces. A non-compressible form body or support is mounted between the coupling pieces as a spacer. The form body is provided at a spacing to that side of the single screw which faces away from the sealing surfaces of the coupling pieces. The form body is configured in such a manner that a lever action occurs when the coupling pieces are screwed together. This lever action leads to a uniform pressing together of the sealing ring between the sealing surfaces of the coupling pieces.

It has been shown that with this simple configuration of the connecting arrangement, a simple assembly or disassembly of the connecting arrangement is possible even in the tightest of spaces because the only attachment means, namely the single screw, is accessible exclusively from one end whereby the connecting arrangement of the invention is assembly-friendly. At the same time, a high sealing of the connecting arrangement is ensured at pressures up to 145 bar and at temperatures up to 180° C. This applies especially when using the coolant R 744 known per se.

The invention is especially characterized in that the introduction of force when joining the coupling pieces takes place eccentrically by only the single screw. A lever action is achieved by the non-compressible form body at the intermediate space of the coupling pieces and leads to an intense pressing together of the sealing ring. In this way, the tightness of the connecting arrangement is ensured. Preferably, at least one coupling piece is already so formed that the non-compressible form body is configured as a component of the coupling piece. The non-compressible form body can be configured as a single piece with the coupling piece.

An advantageous configuration of the invention provides that the sealing ring is a metallic flat ring having a peripherally extending recessed portion. A flat ring of this kind can be advantageously pressed together when the connecting arrangement of the invention is screwed together. The flat ring is especially tight and resistant relative to undercritical and overcritical $CO_2$. Such a metallic flat ring is especially tight and resistant relative to the coolant R 744 and so-called PAG-oils. In conventional connecting arrangements, the use of metallic flat rings as sealing rings is not easily possible. Especially, a very large amount of force must be applied to press the flat ring together in order to achieve absolute seal tightness. In the connecting arrangement of the invention, a pressing together of this kind is possible in a simple way and in the tightest space because of the lever action.

A further embodiment of the invention provides that the sealing ring is set in a plastic cap which is mounted between the sealing surfaces. The plastic cap as well as the first and/or second coupling piece are so configured that the plastic cap can be attached between the sealing surfaces even before screwing the coupling pieces together. Such a plastic cap functions to ensure that the sealing ring is not lost because the sealing ring is not yet fixed before connecting the coupling pieces together with the threaded fastener. Furthermore, a centering of the sealing ring on the sealing surfaces is achieved with the plastic cap. Preferably, the first or the second coupling piece has at least a projection in the outer region of the sealing surface on which the correspondingly configured plastic cap can be releasably attached and especially clipped on. This projection preferably extends peripherally and is directed radially toward the outside.

The line endpieces are connected tightly to the coupling pieces and are mounted so as to be aligned with each other in accordance with another feature of the invention.

It is, however, also practical to arrange the line endpieces at an angle to each other and preferably at right angles to each other. A connecting arrangement configured in this way can be advantageously used in very tight spaces.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
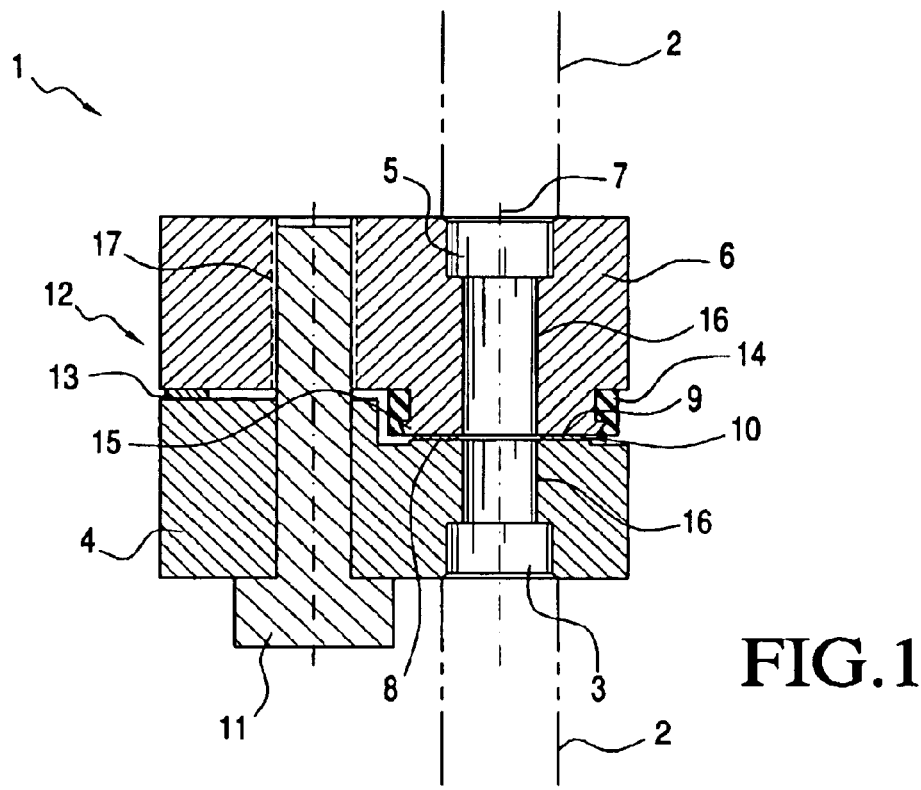
FIG. 1 is a schematic section view of the connecting arrangement according to the invention.

The connecting arrangement 1 shown in FIG. 1 is for coolant lines 2 and comprises a first coupling piece 4 and a second coupling piece 6. The first coupling piece 4 is connected tightly to a first line endpiece 3 and the second coupling piece 6 is tightly connected to a second line endpiece 5. The connection between the coupling pieces (4, 6) and the endpieces (3, 5) is non-detachable. Each of the coupling pieces (4, 6) includes a bore 16 in which the corresponding one of the line endpieces (3, 5) is fitted in. The bore 16 has, at the same time, the function of a connecting channel. Both coupling pieces 4 and 6 are threadably fastened to each other by a single screw 11. A bore 17 in the coupling piece 6 has an internal thread. Because of the threaded connection, the line endpieces (3, 5) are alignedly connected to each other via the bore 16 along an axis 7. The two coupling pieces 4 and 6 furthermore each include a radially extending sealing surface 8 and 9 on the end facing toward the other coupling piece 6 and 4. A sealing ring 10 is arranged between the sealing surfaces 8 and 9. The above-mentioned single screw 11 is arranged laterally of the sealing surfaces 8 and 9.

A non-compressible form body 13 is arranged as a support between the coupling pieces 4 and 6 at a spacing from the single screw 11 and on the side 12 facing away from the sealing surfaces 8 and 9 of the coupling pieces 4 and 6. The form body 13 is so configured that a lever action occurs when the coupling pieces 4 and 6 are screwed together and this lever action leads to a uniform pressing together of the sealing ring 10 between the sealing surfaces 8 and 9 of the coupling pieces 4 and 6. The sealing ring 10 can be made, for example, of aluminum. The non-compressible form body or support 13 is configured as a component of the first coupling piece 4. The support 13 can be formed as an integral raised part of one of the two coupling pieces (4, 6) and is to the left of the single screw 11 as shown in FIG. 1.

The sealing ring 10 is placed in a plastic cap 14 which is arranged between the coupling pieces (4, 6) so that the sealing ring 10 is disposed between the sealing surfaces 8 and 9. The plastic cap 14 and the second coupling piece 6 are so configured that the plastic cap can be attached easily to coupling piece 6 to place the sealing ring 10 between the sealing surfaces 8 and 9 in advance of threadably fastening the coupling pieces 4 and 6 to each other by manipulating the single screw 11. For holding the plastic cap 14 in place, the second coupling piece 6 has a radially extending and outwardly directed projection 15 in the outer region of the sealing surface 9 on which the correspondingly configured plastic cap 14 is clipped on.

Figure 3:
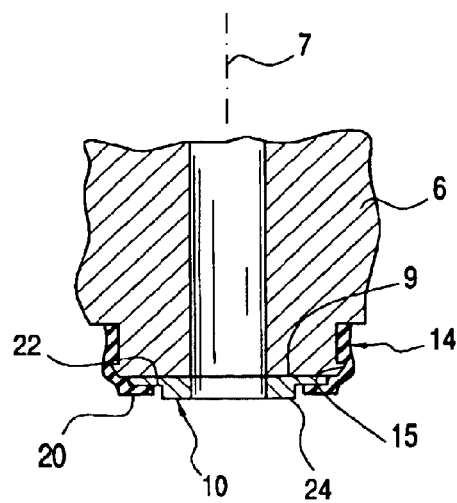
FIG. 3 is a detail section view of a plastic cap holding a sealing ring.

FIG. 3 is a detail view showing the plastic cap 14 in place on coupling piece 6. The plastic cap 14 is clipped on over the annular projection 15 formed in the region of the sealing surface 9. As shown, the annular edge portion 20 of plastic cap 14 holds the sealing ring 10 in place against sealing surface 9 of coupling piece 6. The edge portion 20 engages the sealing ring 10 at an annular recessed portion 22 thereof. The edge portion of the plastic cap can also be in the form of a plurality of fingers disposed in spaced relationship about the periphery of the cap which hold the sealing ring or sealing washer at the recess portion 22 thereof.

When the single screw 11 is manipulated by a user, the coupling pieces (4, 6) are brought together and sealing surface 24 of sealing ring 10 comes into sealing contact engagement with sealing surface 8 of coupling piece 4 whereby a tight seal is established by sealing ring 10 between sealing surfaces 8 and 9 so that coolant can pass through the coupling pieces (4, 6) without leakage.

Figure 2:
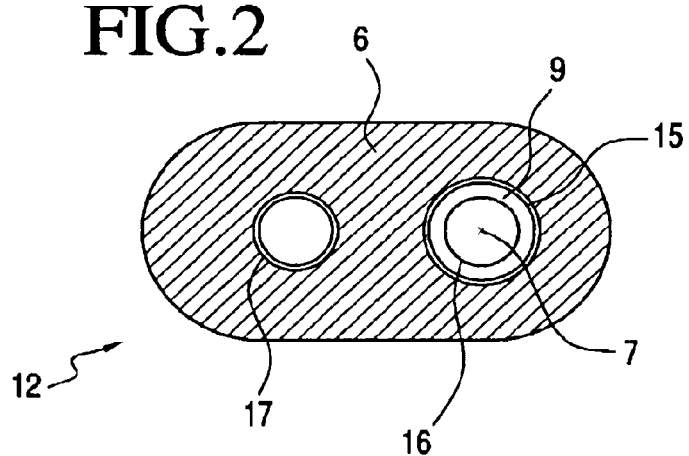
FIG. 2 is a schematic cross-sectional view of the connecting arrangement of the invention.

The coupling piece 4 shown in FIG. 2 has two bores (16, 17). A bore 17 is provided for the single screw 11. The other bore 16 is tightly connected to a line endpiece and has the function of a connecting channel.

Figure 4:
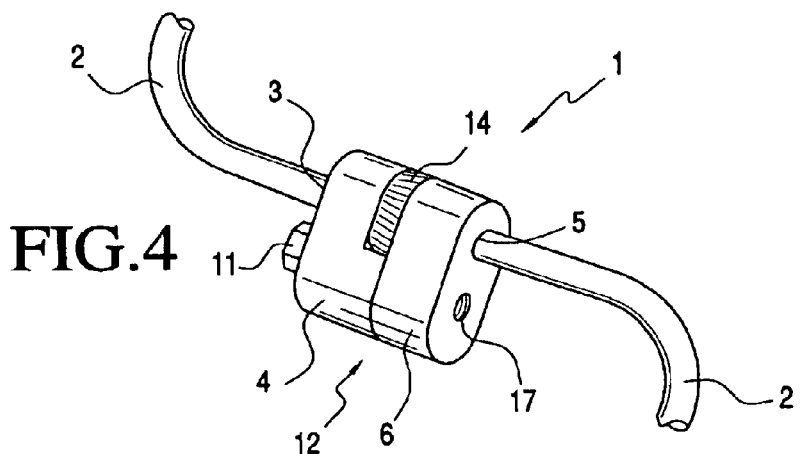
FIG. 4 is a schematic perspective view of the connecting arrangement with aligned line endpieces; and, FIG. 5 is a schematic perspective view of the connecting arrangement of the invention with the line endpieces arranged at right angles to each other.

FIG. 4 shows a schematic perspective view of the connecting arrangement 1 for the coolant line 2 with aligned line endpieces 3 and 5. The connecting arrangement 1 comprises a first coupling piece 4 and a second coupling piece 6. The first coupling piece 4 is connected seal-tight to a first line endpiece 3 and the second coupling piece 6 is connected seal-tight to a second line endpiece 5. Both coupling pieces 4 and 6 are connected to each other via a single screw 11. The single screw 11 is laterally offset from the sealing surfaces of the coupling pieces 4 and 6. A plastic cap 14 is mounted between the sealing surfaces of the coupling pieces 4 and 6 and a sealing ring is disposed in this plastic cap 14. The plastic cap 14 is clipped to the coupling piece 6 for fixing the sealing ring.

Figure 5:
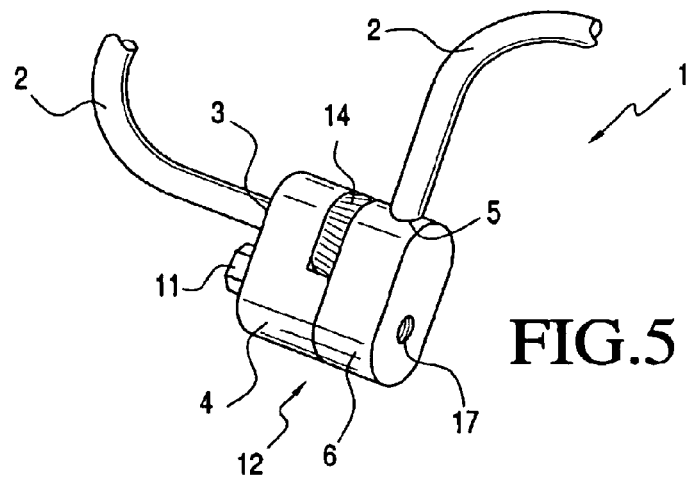

FIG. 5 shows a perspective view of the connecting arrangement 1 of the invention for coolant lines 2 with line endpieces 3 and 5 which are at right angles to each other. A connecting arrangement 1 of this kind can be positioned in the tightest of spaces. The reference numerals of FIG. 5 correspond to the reference numerals used in FIG. 4 and therefore identify the same components.

It is practical to provide a guide pin on one of the coupling pieces (4, 6) and a guide hole on the other one of the coupling pieces (4, 6) to facilitate alignment of the two blocks and sealing surfaces to each other. To include a guide pin and guide hole, the coupling pieces (4, 6) shown in FIG. 1 could be enlarged to right so that the guide pin and guide hole could be provided parallel to axis 7 and to the right of the sealing surfaces (8, 9).

It is understood that the foregoing description is that of the preferred embodiments of the invention and that various changes and modifications may be made thereto without departing from the spirit and scope of the invention as defined in the appended claims.

What is claimed is:

1. A connecting arrangement for coolant lines, the connecting arrangement comprising:

a first coupling piece connectable seal-tight to a first line endpiece;

a second coupling piece connectable seal-tight to a second line endpiece;

said first and second coupling pieces having first and second bores, respectively, and said first and second bores communicating with said first and second line endpieces, respectively;

a single screw joining said first and second coupling pieces so as to cause said first and second line endpieces to communicate with each other via said first and second bores;

said first and second coupling pieces having first and second sealing surfaces facing toward each other;

a seal unit disposed between said first and second coupling pieces;

said seal unit including a plastic cap and a sealing ring seated in said plastic cap;

a non-compressible body disposed between said first and second coupling pieces at a distance from said single screw which is so configured that a lever action arises when said single screw is manipulated to draw said first and second coupling pieces toward each other with said lever action leading to a uniform pressing of said sealing ring between said first and second sealing surfaces;

said first and second sealing surfaces extending radially and being laterally offset from said single screw on a side of said single screw facing away from said non-compressible body; and, said plastic cap and one of said first and second coupling pieces conjointly defining a latching interface so as to permit said seal unit to be mounted on said one coupling piece so as to place said sealing ring between said first and second sealing surfaces before said single screw is manipulated to draw said coupling pieces and said sealing surfaces toward each other.

2. The connecting arrangement of claim 1, wherein said non-compressible body is an integral part of one of said first and second coupling pieces.

3. The connecting arrangement of claim 1, wherein said sealing ring is a flat sealing ring having a peripheral recessed portion.

4. The connecting arrangement of claim 1, said latching interface including a radially outwardly directed projection formed on said one coupling piece at the outer region of the sealing surface corresponding thereto to facilitate clipping said plastic cap to said one coupling piece.

5. The connecting arrangement of claim 1, wherein said first and second line endpieces are aligned with each other in the assembled state.

6. The connecting arrangement of claim 1, wherein said first and second line endpieces are at right angles to each other in the assembled state.

* * * * *